US012680337B2

(12) United States Patent
Stutelberg

(10) Patent No.: US 12,680,337 B2
(45) Date of Patent: Jul. 14, 2026

(54) EXTERNAL DOORKNOB LOCKING SHROUD

(71) Applicant: Robert James Stutelberg, Hastings, MN (US)

(72) Inventor: Robert James Stutelberg, Hastings, MN (US)

( * ) Notice: Subject to any disclaimer, the term of this patent is extended or adjusted under 35 U.S.C. 154(b) by 104 days.

(21) Appl. No.: 18/363,519

(22) Filed: Aug. 1, 2023

(65) Prior Publication Data

US 2025/0043592 A1 Feb. 6, 2025

(51) Int. Cl.
*E05B 13/00* (2006.01)
*E05B 1/00* (2006.01)

(52) U.S. Cl.
CPC .......... *E05B 13/001* (2013.01); *E05B 1/0061* (2013.01)

(58) Field of Classification Search
CPC ....... E05B 1/0061; E05B 13/001; E05B 17/14
USPC .......................................................... 16/255
See application file for complete search history.

(56) References Cited

U.S. PATENT DOCUMENTS 738,039 A * 9/1903 Hoffman ................ E05D 5/121 16/255
1,829,444 A * 10/1931 Goebel .................. E05B 37/00 70/284
3,245,240 A * 4/1966 De Forrest ............ E05B 13/001 70/2
3,343,387 A * 9/1967 Aldrich ................. E05B 13/001 70/424
4,570,470 A * 2/1986 Gray, Sr. ............... E05B 13/001 70/424
4,631,938 A * 12/1986 Johnson ................ E05B 13/001 70/427
4,838,059 A * 6/1989 Johnson ................ E05B 17/142 70/427
4,899,564 A * 2/1990 Gilbert .................. E05B 13/001 70/424
5,201,202 A * 4/1993 Kam ..................... E05B 13/001 70/168
5,203,187 A * 4/1993 Kane ..................... E05B 13/001 70/424
5,425,256 A * 6/1995 Crosby ................. E05B 13/001 70/165
5,560,235 A * 10/1996 Aucoin ................. E05B 13/001 70/168
8,057,123 B2 * 11/2011 Monneret ........... E02D 29/1463 16/256

* cited by examiner

*Primary Examiner* — Christopher J Boswell
(74) *Attorney, Agent, or Firm* — Michael L. Greenberg, Esq.; Greenberg & Lieberman, LLC

(57) ABSTRACT

A locking doorknob shroud, configured to be placed over a doorknob, padlock, or similar closing mechanism. The shroud is equipped with two halves which interlock together and seal firmly with a latch. A keyhole, present at a junction of the two halves within the latch, is configured to accept a key, which when turns, unlocks the latch. Alternately, or in addition, a padlock may be used to further secure the latch. A spring assembly disposed in communication with at least one hinge enables the two halves to open about the at least one hinge, providing access to the doorknob when permitted.

2 Claims, 3 Drawing Sheets

EXTERNAL DOORKNOB LOCKING SHROUD

FIELD OF THE PRESENT INVENTION

The present invention relates to the field of security equipment, and more specifically relates to a locking shroud device for doorknobs which is configured to sufficiently cover the entirety of a doorknob of a door such that the knob may not be turned without first unlocking and removing the locking shroud device.

BACKGROUND OF THE PRESENT INVENTION

Many doorknobs are conventionally equipped with a locking mechanism configured to prevent the turning of the doorknob such that the door may not be opened until unlocked. However, this security mechanism has inherent limitations, and can easily be circumvented. Further, nothing protects the keyhole of the doorknob from being picked.

If there were a way in which the doorknob itself could be covered with an external shroud, the doorknob would not be able to turn without removal of the shroud. If the shroud were equipped with an integrated lock, the security of the door would be enhanced.

Thus, there is a need for a locking doorknob shroud configured to encompass a doorknob to securely prevent access to the doorknob and integrated doorknob lock (if present). Such a device is preferably configured to lock closed around the entirety of the doorknob, only to be opened with a unique key. An internal spring mechanism allows the shroud to pop open when unlocked with the key, expediting warranted access to the doorknob when needed.

SUMMARY OF THE PRESENT INVENTION

The present invention is a locking doorknob shroud configured to encompass a doorknob of a door to prevent access to a keyhole of the doorknob, as well as the doorknob itself, enhancing the security of the door.

The following brief and detailed descriptions of the drawings are provided to explain possible embodiments of the present invention but are not provided to limit the scope of the present invention as expressed herein this summary section.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

The present invention will be better understood with reference to the appended drawing sheets, wherein.

DETAILED DESCRIPTION OF THE PREFERRED EMBODIMENT

Figure 1:
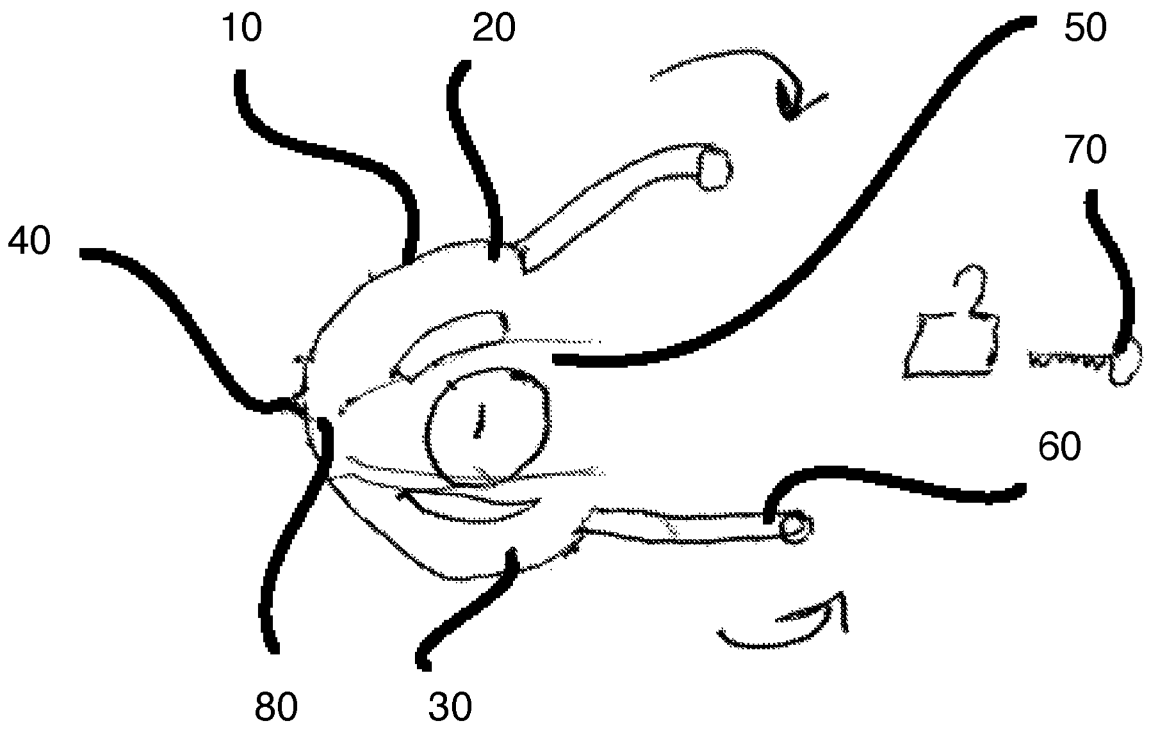
FIG. 1 shows a view of the device of the present invention as seen from the side, installed on a doorknob, in the opened position in preparation to be locked over the doorknob.
Figure 2A:
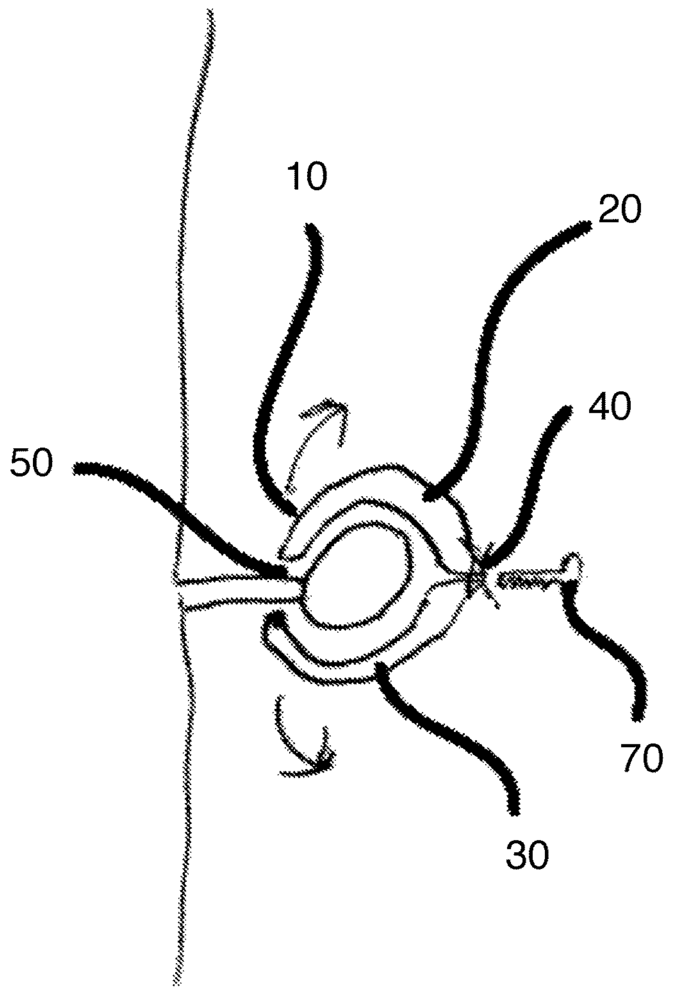
FIG. 2A shows a view of the device of the present invention as seen from the side, shown in the locked position.
Figure 2B:
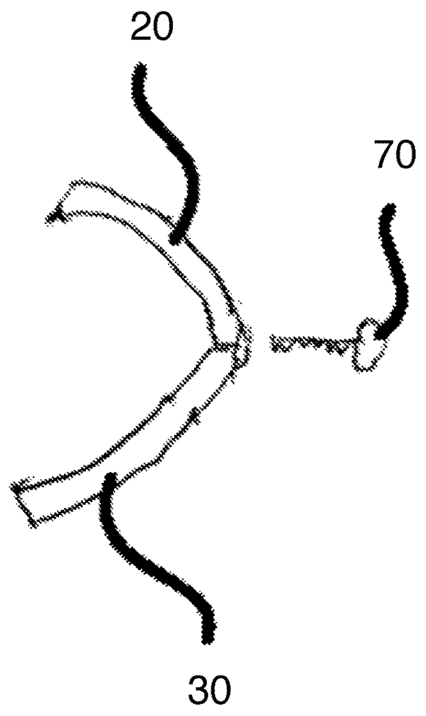
FIG. 2B shows a view of the device of the present invention as seen from the side, detached from a doorknob.

The present specification discloses one or more embodiments that incorporate the features of the invention. The disclosed embodiment(s) merely exemplify the invention. The scope of the invention is not limited to the disclosed embodiment(s).

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment, Further, when a particular feature, structure, or characteristic is described in connection with an embodiment, it is submitted that it is within the knowledge of one skilled in the art to effect such feature, structure, or characteristic in connection with other embodiments whether or not explicitly described.

The present invention is a locking doorknob shroud (10) configured to prevent unauthorized access to a doorknob. The preferred embodiment of the present invention is equipped with a shroud (10) having a first half (20) and a second half (30). The first half (20) and second half (30) are joined together via at least one hinge (40). At, or adjacent to, the at least one hinge (40), a gap (50) is present for the passage of a shaft of the doorknob assembly to extend out of the shroud (10) while the present invention is closed and in use. The first half (20) and second half (30) are configured to clasp closed around the doorknob of a door. The closure of the halves are reinforced via a latch (60) equipped with a lock which may only be unlocked via a key (70). The latch (60) is preferably present on an end of the shroud (10) opposite from the hinge (40). The lock may be a padlock, combination lock, or similar conventional locking mechanism. The external lock (padlock, combination lock, etc.) may be disposed separately from the primary lock disposed within the latch (60) of the present invention. Further, the external lock may be an optional component supplied by the end user.

A spring assembly (80) disposed in communication with the at least one hinge (40) is configured to facilitate the closure of the first half (20) and second half (30) together, forming an oblong cylindrical shape. However, alternate embodiments of the present invention may exhibit other three-dimensional shapes as desired. Upon turning the key (70), the latch (60) is opened, and the spring assembly (80) releases tension, causing the first half (20) and second half (30) to separate apart, providing access to the doorknob.

Figure 3:
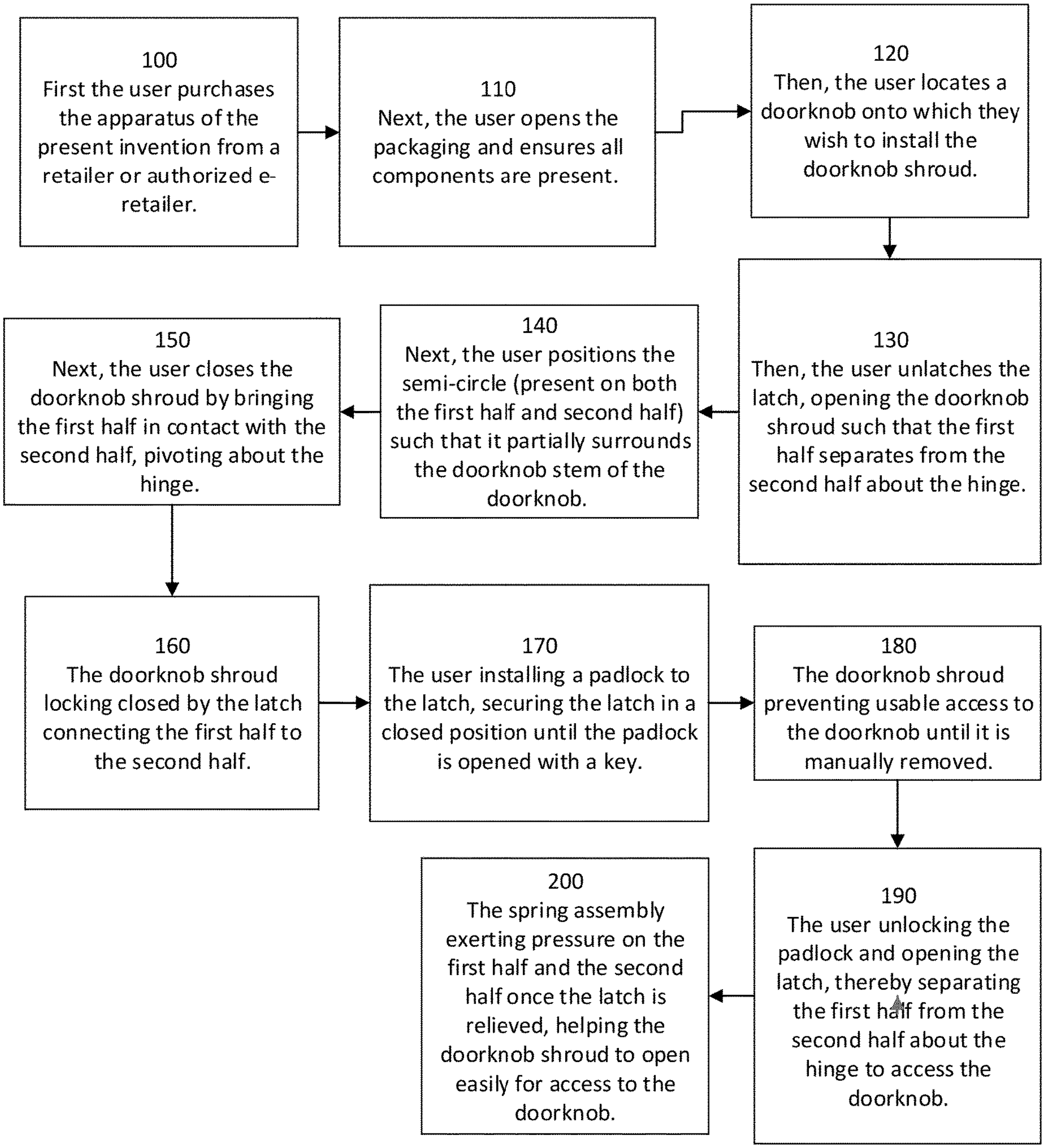
FIG. 3 exhibits a flow chart of the method of use of the present invention by a user to secure a doorknob.

As depicted in FIG. 3, the process of use of the apparatus of the present invention is preferably as follows:

1. First the user purchases the apparatus of the present invention from a retailer or authorized e-retailer. (100)
2. Next, the user opens the packaging and ensures all components are present. (110)
3. Then, the user locates a doorknob onto which they wish to install the doorknob shroud. (120)
4. Then, the user unlatches the latch, opening the doorknob shroud such that the first half separates from the second half about the hinge. (130)
5. Next, the user positions the semi-circle (present on both the first half and second half) such that it partially surrounds the doorknob stem of the doorknob. (140)

6. Next, the user closes the doorknob shroud by bringing the first half in contact with the second half, pivoting about the hinge. (150)
7. The doorknob shroud locking closed by the latch connecting the first half to the second half. (160)
8. The user installing a padlock to the latch, securing the latch in a closed position until the padlock is opened with a key. (170)
9. The doorknob shroud preventing usable access to the doorknob until it is manually removed. (180)
10. The user unlocking the padlock and opening the latch, thereby separating the first half from the second half about the hinge to access the doorknob. (190)
11. The spring assembly exerting pressure on the first half and the second half once the latch is relieved, helping the doorknob shroud to open easily for access to the doorknob. (200)

It should be noted that in some alternate embodiments of the present invention, the shroud (10) may be a fabric enclosure, such as Kevlar™ or a similar heavy-duty material. Further, in some alternate embodiments, the enclosure of the shroud (10) may be equipped with a zipper for additional security. Additionally, it should be noted that the spring assembly (80) of the present invention may exhibit multiple springs disposed around or within the at least one hinge (40). The latch (60) of the present invention may be equipped with an internal locking mechanism, which may be released with the key (70) in lieu of, or in addition to, the use of a padlock.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. A lockable shroud for a doorknob and doorknob stem comprising:

a shroud body, said shroud body having a first half and a second half;

wherein said first half has an outer curvature for a first 180 degrees around, terminating in a first flat surface;

wherein said second half has an outer curvature for a second 180 degrees around, terminating in a second flat surface, said second flat surface configure to mate flush with said first flat surface;

wherein said shroud body is of a unibody design without any removable components;

wherein said first half is permanently connected to said second half at a hinge;

wherein said first half and said second half, when closed together such that said first half mirrors said second half, a circular gap is present;

wherein said first half and said second half, when closed together, cover the entirety of the doorknob, including a keyhole of the doorknob;

a latch, said latch configured to lock said first half to said second half;

a spring assembly, said spring assembly disposed in communication with said hinge;

wherein said latch is configured to maintain a seal between said first half and said second half when latched;

wherein said latch is configured accept a padlock;

wherein said padlock only opens via a key;

wherein upon release of said latch, said spring assembly releases tension, causing said first half to separate from said second half about said hinge, permitting access to the doorknob;

wherein said gap is configured to permit passage of the doorknob stem when latched;

wherein said hinge is disposed inside of said shroud body, thereby preventing tampering when said latch is latched; and wherein said shroud body is composed of fabric.

2. A lockable shroud for a doorknob and doorknob stem comprising:

a shroud body, said shroud body having a first half and a second half;

wherein said first half has an outer curvature for a first 180 degrees around, terminating in a first flat surface;

wherein said second half has an outer curvature for a second 180 degrees around, terminating in a second flat surface, said second flat surface configure to mate flush with said first flat surface;

wherein said shroud body is of a unibody design without any removable components;

wherein said first half is permanently connected to said second half at a hinge;

wherein said first half and said second half, when closed together such that said first half mirrors said second half, a circular gap is present;

wherein said first half and said second half, when closed together, cover the entirety of the doorknob, including a keyhole of the doorknob;

a latch, said latch configured to lock said first half to said second half;

a spring assembly, said spring assembly disposed in communication with said hinge;

wherein said latch is configured to maintain a seal between said first half and said second half when latched;

wherein said latch is configured accept a padlock;

wherein said padlock only opens via a key;

wherein upon release of said latch, said spring assembly releases tension, causing said first half to separate from said second half about said hinge, permitting access to the doorknob;

wherein said gap is configured to permit passage of the doorknob stem when latched;

wherein said hinge is disposed inside of said shroud body, thereby preventing tampering when said latch is latched;

wherein said shroud body is composed of fabric; and wherein said fabric is Kevlar™.

* * * * *